US012810345B2

(12) United States Patent
Ghate et al.

(10) Patent No.: US 12,810,345 B2
(45) Date of Patent: Nov. 24, 2026

(54) MACHINE LEARNING MODEL FOR PROCESSING A COMMUNICATION RECORD AND IDENTIFYING AN ACTION

(71) Applicant: Coupa Software Incorporated, San Mateo, CA (US)

(72) Inventors: Sameer Ghate, San Francisco, CA (US); Snigdha Dharmavaram, San Francisco, CA (US)

(73) Assignee: Coupa Software Incorporated, Foster City, CA (US)

( * ) Notice: Subject to any disclaimer, the term of this patent is extended or adjusted under 35 U.S.C. 154(b) by 86 days.

(21) Appl. No.: 18/887,976

(22) Filed: Sep. 17, 2024

(65) Prior Publication Data

US 2026/0080457 A1 Mar. 19, 2026

(51) Int. Cl.

| | |
|---|---|
| ***G06Q 30/0601*** | (2023.01) |
| ***G06N 5/04*** | (2023.01) |
| ***G06N 20/00*** | (2019.01) |

(52) U.S. Cl.
CPC ........... *G06Q 30/0635* (2013.01); *G06N 5/04* (2013.01); *G06N 20/00* (2019.01)

(58) Field of Classification Search
CPC ....... G06Q 30/0635; G06Q 30/0207–30/0277; G06Q 50/01; G06N 5/04; G06N 20/00; H04L 67/20; H04L 67/306
See application file for complete search history.

(56) References Cited

U.S. PATENT DOCUMENTS

| | | | | |
|---|---|---|---|---|
| 9,384,497 | B2 * | 7/2016 | Calman | G06Q 30/0251 |
| 10,497,004 | B2 * | 12/2019 | Shaev | G06F 40/216 |
| 10,817,509 | B2 * | 10/2020 | Korpusik | G06F 16/243 |
| 11,164,152 | B2 * | 11/2021 | Al-Sinan | G06Q 30/08 |
| 11,182,762 | B1 * | 11/2021 | Bell | G06Q 20/12 |
| 11,334,593 | B2 * | 5/2022 | Zorin | G06F 16/254 |
| 11,373,045 | B2 * | 6/2022 | Bealby-Wright | G10L 15/18 |
| 11,954,485 | B1 * | 4/2024 | Kadu | G06F 18/24 |
| 2004/0243501 | A1 | 12/2004 | Duffey, Jr. | |
| 2016/0328803 | A1 * | 11/2016 | Whitley | H04W 88/02 |
| 2019/0095927 | A1 * | 3/2019 | Shimpi | G06Q 30/016 |
| 2019/0362452 | A1 * | 11/2019 | Brunets | G06Q 10/107 |
| 2021/0097491 | A1 * | 4/2021 | Minyard | G06N 20/00 |
| 2023/0297781 | A1 * | 9/2023 | Kurian | G06F 40/30 |
| 2023/0393843 | A1 * | 12/2023 | Touati | G06F 16/2315 |
| 2024/0062016 | A1 * | 2/2024 | Tong | G06F 40/20 |

(Continued)

OTHER PUBLICATIONS

Intelligent Technologies for Intelligent ERPs (Year: 2021).*

(Continued)

*Primary Examiner* — Gautam Ubale
(74) *Attorney, Agent, or Firm* — Baker Botts L.L.P.

(57) ABSTRACT

In an embodiment, a computer-implemented method includes parsing a communication record, determining one or more intents of the communication record using a trained machine learning model, linking the communication record to one or more record IDs, identifying one or more fields within the communication record, presenting the communication record in a standardized form, including identification of intent, the standardized form resulting from the identified one or more fields, and determining a corresponding intent related action on the determined one or more intents.

24 Claims, 7 Drawing Sheets

(56) References Cited

U.S. PATENT DOCUMENTS

| | | | | |
|---|---|---|---|---|
| 2024/0370432 | A1* | 11/2024 | Devaux | H04L 51/02 |
| 2025/0071074 | A1* | 2/2025 | Sebastian | G06F 40/205 |
| 2025/0077581 | A1* | 3/2025 | Gupta | G06F 16/90324 |
| 2025/0080601 | A1 | 3/2025 | Shevchenko et al. | |
| 2025/0173731 | A1 | 5/2025 | Gorny | |
| 2025/0182764 | A1 | 6/2025 | Graff et al. | |
| 2025/0321989 | A1* | 10/2025 | Saraf | G06F 16/30 |

OTHER PUBLICATIONS

Optimising Human-Machine Collaboration for Efficient High-Precision Information Extraction from Text Documents (Year: 2023).*

Information_extraction_from_unstructured_data_using_RDF (Year: 2016).*

Line-items and table understanding in structured documents (Year: 2019).*

* cited by examiner

MACHINE LEARNING MODEL FOR PROCESSING A COMMUNICATION RECORD AND IDENTIFYING AN ACTION

TECHNICAL FIELD

One technical field of the disclosure is machine learning models for processing a communication record and identifying an action based on the communication record.

BACKGROUND

Modern digital work environments include numerous hosted or online software systems for executing applications in different domains. One example domain is e-procurement, which involves online distributed computing systems programmed to manage digital electronic orders, invoices, supplier data, buyer data, and transactions between buyer and supplier computers, typically associated with business enterprises. SaaS-based, multi-tenant e-procurement computer systems are available that host interaction with many buyer computers and supplier computers using web browsers.

While these online platforms have extensive capability, much document processing and communication in this domain still occurs outside the platform via conventional electronic means such as emails, chats, and texts. These communications can contain order changes, confirmations, delay notifications, and other messages relevant to a transaction, but applying the content of these messages to transactions in the platform often necessitates manual intervention to extract and act upon relevant information. The workflow typically involves opening emails, identifying important details, opening and reading attached documents such as PDFs, and then manually updating the online system, sometimes multiple online systems. Manual handling of these communications is time-consuming and prone to errors, presenting a clear opportunity for automation. It is also inefficient to manually determine how to move substantive data values from an email or other communication into the structured fields of a database record of a transaction.

Machine learning models (MLMs), such as trained linear classifiers, can be trained and then used to read electronic communications and output predictions of the content. Generative artificial intelligence (AI) technology using large language models (LLMs) can generate natural-sounding output text in reply to a query.

However, the output of these models typically is "not ready to ship"—it cannot be used directly to modify records in another system with complete confidence. Consequently, integrating automated reading techniques into various online systems has lagged. What is needed is an improved way to programmatically read large numbers of documents, determine their contents, determine how the contents affect another online system or host system, determine if the content can be applied to that system, and efficiently update structured records of the system.

SUMMARY

The appended claims may serve as a summary of the invention.

DETAILED DESCRIPTION

Figure 1:
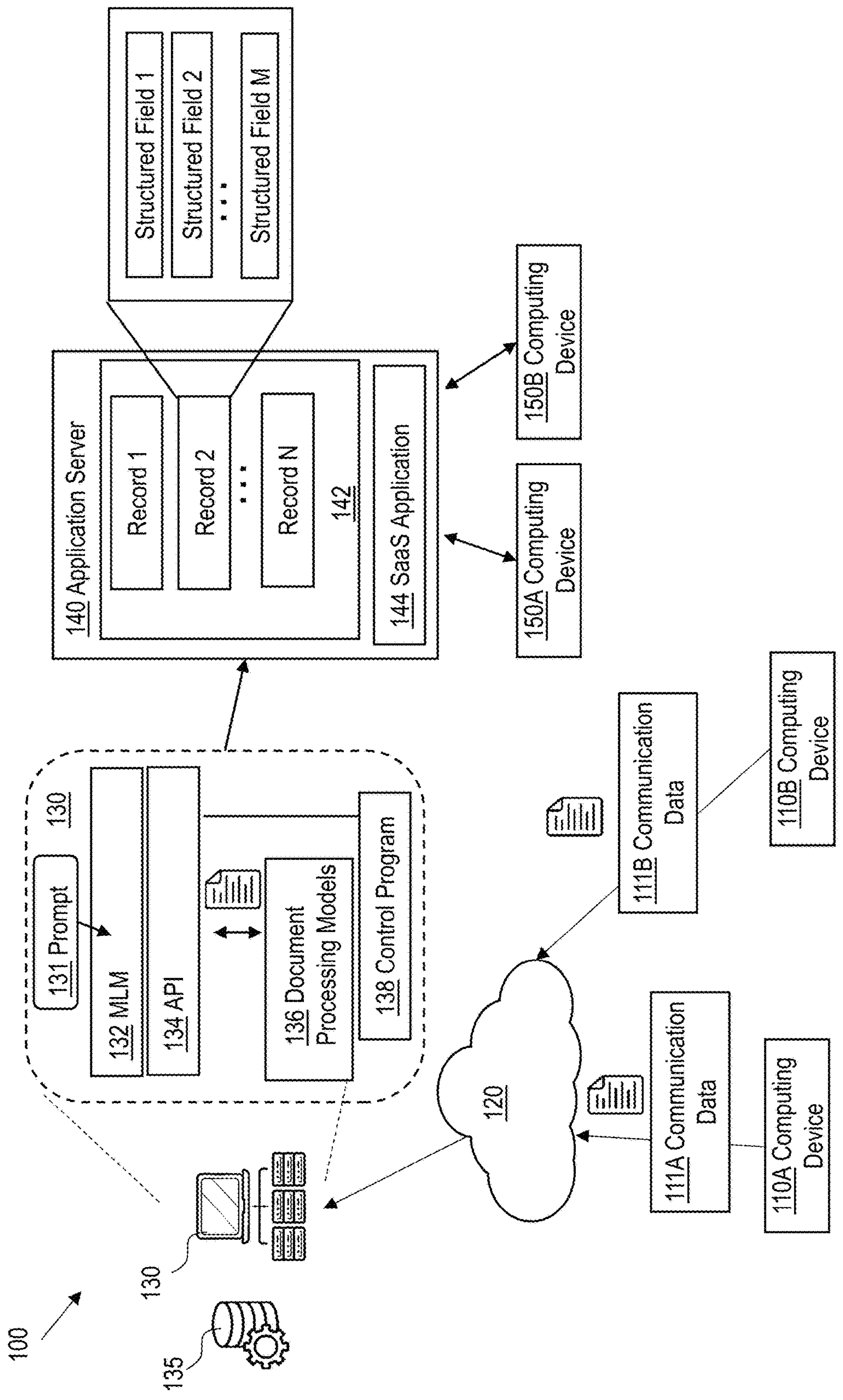
FIG. 1 illustrates an example computer system for receiving and processing communication data in one embodiment.

Embodiments are described in sections according to the following outline:

1. GENERAL OVERVIEW
2. EXAMPLE DISTRIBUTED COMPUTER SYSTEM, MODEL, AND USER INTERFACE
3. IMPLEMENTATION EXAMPLE-HARDWARE OVERVIEW

1. General Overview

The following description provides numerous specific details to explain the present disclosure thoroughly. However, embodiments of the present disclosure may be practiced without these specific details. In other instances, well-known structures and devices are shown in block diagram form to avoid unnecessarily obscuring the description.

The text of this disclosure, in combination with the drawing figures, is intended to state in prose the algorithms that are necessary to program the computer to implement various embodiments at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement embodiments of the present disclosure.

Various embodiments may be described in this disclosure to illustrate various aspects. Other embodiments may be utilized, and structural, logical, software, electrical, and other changes may be made without departing from the scope of the embodiments that are specifically described. Various modifications and alterations are possible and expected. Some features may be described with reference to one or more embodiments or drawing figures, but such features are not limited to usage in the one or more embodiments or figures with reference to which they are described. Thus, the present disclosure is neither a literal description of all embodiments nor a listing of features that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate various possible embodiments and to fully illustrate one or more aspects of the present disclosure. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary, and does not imply that the illustrated process is preferred. The steps may be described once per embodiment but need not occur only once. Some steps may be omitted in some embodiments or occurrences, or some steps may be executed more than once in each embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present disclosure in which, for example, functions may be executed out of order from that shown or discussed, including substantially concurrently or in reverse order, depending on the functionality involved.

2. Example Distributed Computer System, Model, and User Interface

Embodiments of the disclosure provide a computer-implemented method and a distributed computer system for receiving electronic documents, such as electronic communications, automatically reading the electronic communications, determining or identifying one or more intents in the electronic communications, entering non-committed updates into an online system based on the intents, presenting the updates and/or intents in a graphical user interface in a standardized format optionally together with the original electronic communications, and providing an interface programmed to receive action inputs based on the presented communications. Embodiments offer a solution to streamline and automate selected aspects of handling or processing electronic communications that express the intent to change other documents, systems, or processes. Trained MLMs can automatically read communications, extract key information corresponding to intent or updates, and create structured data objects within existing systems to update the systems, thereby minimizing the need for manual input and reducing the potential for errors. At the same time, users of the systems retain control by seeing non-committed updates to the systems in a GUI with the ability to inspect, approve, or decline the updates while optionally concurrently viewing the original online communications, enabling a user to confirm the intent and/or confirm that the predictions or output of the MLM was correct.

Using MLMs provides a comprehensive solution that processes electronic documents, handles attachments, and creates structured data objects based on the extracted content. This approach enhances the efficiency and accuracy of document processing and facilitates the seamless integration of electronic communications into automated workflows.

2.1 Structural Overview

FIG. 1 illustrates an example computer system in one embodiment. Computer system 100 comprises a plurality of computing devices 110A and 110B coupled via a network 120 to a computer system 130, database 135 coupled to computer system 130, and an application server 140 to which computing devices 150A, 150B are coupled. To illustrate a clear example, FIG. 1 shows a limited number of elements, such as pairs of computing devices and two items of communication data, but practical embodiments can use any number of such elements.

Each of the computing devices 110A and 110B is an end-user computing device and may comprise any of a laptop computer, desktop computer, workstation, tablet computer, network computer, or smartphone. In some cases, the computing devices 110A and 110B can be operated by suppliers of goods or services for a set of buyers; in that context, the computing devices 110A and 110B can be termed supplier devices and buyer devices. Each of the computing devices 110A and 110B is associated with respective communication data 111A and 111B, the use of which will be described further in other sections.

Network 120 may be any wireless and/or wired network type. Network 120 may or may not be connected to the Internet or public network. Network 120 may include a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (for example, cellular networks, such as 4G or 5G), a plain old telephone (POT) network, a wireless data network (for example, Wi-Fi, Wi-Gig, or Wi-Max), a long-term evolution (LTE) network, a universal mobile telecommunications system (UMTS) network, a peer-to-peer (P2P) network, a Bluetooth network, a near field communication (NFC) network, and/or any other network. Network 120 may be configured to support one or more communication protocols, such as IP, TCP, HTTP, and other application-layer protocols.

Computer system 130 is communicatively coupled to an application server 140. For purposes of illustrating a clear example, FIG. 1 shows network 120 in one position between the computing devices 110A and 110B and computer system 130, but the same network or different networks can be used to connect computer system 130 and application server 140, and the computing devices 150A, 150B to the application server. Or, in another embodiment, direct links or other networks can be used, with wireless, wired, satellite, or terrestrial links.

The computer system 130 comprises a trained machine-learning model (MLM) 132, an application programming interface (API) 134, one or more document processing models 136, and a control program 138. Other sections of this disclosure give the functions and use of these elements in solving the technical problem(s) of the Background. Unless indicated otherwise, expressly or by the context, the control program 138 is programmed to execute all machine functions of this disclosure.

Computer system 130 can be any computer supporting the operation of MLMs such as MLM 132 and one or more document processing models 136. For example, computer system 130 may include one or more servers like web servers, application servers, file servers, or database servers, databases, cloud computing systems, or edge computing systems. In certain instances, computer system 130 can include workstations, PCs, portable computers, handheld devices, mobile computing devices, virtual computing machines, instances within a data center, and/or network computers. Additional details on implementing computer system 130 are described in FIG. 6, which outlines a possible configuration of computer system 130, including a processor, memory, various input/output devices, and communication interfaces.

Computer system 130 may be communicatively coupled to a database 135 for digitally storing data, including communication data 111A and 111B. Database 135 can be any type of database, including relational databases such as MySQL, PostgreSQL, Oracle Database, and Microsoft SQL Server. It may also be a NoSQL database, which encompasses document stores like MongoDB and CouchDB, key-value stores like Redis and DynamoDB, column stores like Apache Cassandra and HBase, and graph databases like Neo4j and Amazon Neptune. Additionally, it can be an in-memory database like Redis or Memcached, or an object-oriented database such as db4o, ObjectDB, and InterSystems Cache.

In an embodiment, the application server 140 comprises a data repository 142 and a SaaS application 144. The data repository 142 can be implemented using a relational database system, object database system, NoSQL database, or other repository and stores a plurality of data records denoted record 1, record 2, record N, where record "N" signifies that the disclosure places no fixed limit on the number of possible records. In an embodiment, data repository 142 implements a shared, multi-tenant database in which programmatic security controls isolate the data of one tenant or customer of the application server 140 from the data of all other tenants or customers. As shown for record 2, each record of the data repository 142 can comprise a plurality of structured fields denoted structured field 1, structured field 2, and structured field M, where "M" signifies that the disclosure places no fixed limit on the number of possible fields.

The SaaS application 144 can be implemented as a business application, educational service, engineering service, government application, or military service. In one embodiment, the SaaS application implements a transaction processing service in which computing devices of buyers and suppliers can create and negotiate purchase orders, invoices, shipping documents, catalogs, and other aspects of an online, real-time e-procurement application.

2.2 Functional Overview

Computer system 130 may operate under the control of the control program 138 and is programmed or configured to receive communication data, such as the communication data 111A and 111B, from the plurality of computing devices 110A and/or 110B. Communication data 111A and 111B may include emails, multimedia files, PDFs, and/or any other electronic document types. Thus, the communication data 111A and 111B may include natural language, structured, or formatted text. In some embodiments, communication data 111A and/or 111B can include emails that may include attachments. Typically, the communication data 111A and 111B are relevant to record 1, record 2, or record N of the application server 140, but the computing devices 110A and 110B do not or cannot directly access application server 140 to update it. For example, the communication data 111A and 111B can comprise emails, text messages, or attachments that express the intent to create, read, update, or delete records of the application server 140, transactions, or transaction documents associated with the SaaS application 144, but the computing devices 110A and 110B may lack accounts or permission to directly update the records.

After receiving the communication data 111A and 111B from the computing devices 110A and 110B, the computer system 130 is programmed to process the communication data using one or more of MLM 132 and document processing models 136. In an embodiment, MLM 132 is trained for identifying one or more intents represented in communication data 111A and 111B. Control program 138 can be programmed to call SaaS application 144 to request the system to create non-committed updates to system records, such as record 1, record 2, or record N, based on the intents. The SaaS application 144 is programmed to present the updates and/or the communication data 111A and 111B in a standardized format to computing devices 150A or 150B via an interface of the SaaS application.

MLM 132 may be any machine learning model for processing communications. For example, MLM 132 may include a rule-based model configured for parsing electronic communication to determine patterns within such communications. For example, the rule-based model can utilize regular expressions (regex) for parsing subjects of communication, email addresses, addresses, dates, IDs, purchase order (PO) numbers, product descriptions, and the like. Further, MLM 132 may include an LLM to interpret and extract key information from the communication data 111A and 111B.

It should be noted that not only electronic communication documents can be parsed, but other types of documents as well. For example, sourcing replies, order modifications, and invoices can be parsed. In some cases, any relevant attachments to the emails can also be parsed.

2.2.1 MLM Training

MLM 132 can be trained to parse electronic documents and determine intents, subjects, dates, and other relevant information using advanced natural language processing (NLP) techniques. MLM 132 can comprise a transformer-based model (for example, Bidirectional Encoder Representations from Transformers (BERT), Generative Pre-trained Transformer (GPT)) and recurrent neural networks (RNNs) like Long Short-Term Memory (LSTM) models. MLM 132 can be trained to identify multiple intents within an email, extract key information, and understand the context of the communication. In an embodiment, the control program 138 is programmed to read communication data 111A and 111B to convert words into dense vector representations using embeddings like Word2Vec, GloVe, or contextual embeddings from transformer models and request MLM 132 to initiate training over the resulting data or execute the inference stage over text that is OCR'd or otherwise extracted from the communication data. Attention mechanisms help the MLM 132 focus on relevant parts of the communication data 111A and 111B to accurately determine intents through multi-label classification. Named Entity Recognition (NER) models, combined with pattern matching and regular expressions, may extract subjects and dates.

In an embodiment, training the MLM 132 comprises collecting a large corpus of labeled electronic documents, preprocessing the text, and using supervised learning to map various fields identified in input electronic documents to corresponding field labels. MLM 132 can then be used to identify intents within these documents, as well as to identify different labeled fields such as subjects, dates, items described in the documents, prices, quantities, orders, order numbers, supplier information, status, email senders, email receivers, number of days pending for reviews, line numbers for different fields, confirmation status, and other fields as further discussed below. The training process includes obtaining predictions for fields and intents and minimizing errors by adjusting the parameters of MLM 132 via a backpropagation process using a loss function for evaluating the model's error. In some embodiments, MLM 132 may include multiple MLMs configured for a specific task. For example, some MLMs may determine intent within electronic documents, while others may identify various fields.

In some cases, when the training data set includes an electronic document containing multiple lines of text, with each line associated with a particular intent, each line of text in such an electronic document can be labeled with a corresponding intent. MLM 132 is configured to recognize the intent for each line of the electronic document, ensuring it matches the labeled intent data for that line.

The training process uses a loss function such as Binary Cross-Entropy for multi-label classification and optimizers like Adam or RMSprop. Fine-tuning pre-trained models like BERT or GPT on the specific dataset enhances performance. The model's performance is evaluated using Precision, Recall, F1-Score, and Accuracy metrics. Once trained, the model can be deployed as an API, integrating seamlessly into existing systems for real-time document parsing. Continuous learning through feedback loops ensures the model adapts to new data, while cloud services provide scalable deployment solutions. This approach automates document processing by converting electronic documents into structured data, identifying multiple intents, subjects, dates, and other critical information, making it invaluable for applications like customer service, automated workflow management, and intelligent communication systems.

2.2.2 Inference Stage Execution

Processing communication data 111A and 111B comprises executing the inference stage of the MLM 132, after training, over the communication data to yield output predictions and confidence data, which can be used to create and store non-committed updates to records 1, 2, N of data repository 142 via SaaS application 144. In some cases, file attachments associated with communication data 111A and 111B may be processed by one or more document processing models 136, invoked via an API 134. Document processing models 136 may also include machine learning models (MLMs) usable in the inference stage for classifying and extracting data records from the attachments.

File attachments associated with communication data 111A and 111B can be data files containing text, images, video, or other multimedia formats. Attachments can be files of any format, such as PDF, Word, PowerPoint, and the like. Such documents may include invoices, contracts, receipts, financial statements, letters, emails, purchase orders, employee handbooks, memos, slide presentations, and more. These documents may contain various data fields, which can be classified as headers, billing information, customer information (for example, customer name, address, email, or occupation), dates, due dates, itemized lists of products or services, payment information, sections about terms and conditions, invoice numbers, notes, and other relevant fields. Many common fields, ranging from tens to hundreds, may be utilized in various scenarios.

Document processing models 136 are often used to process documents and classify these common fields. When these document processing models 136 are MLMs, they efficiently classify the data fields within the documents, ensuring accurate information extraction and organization.

2.2.3 Updates to Application Server and Graphical User Interface Examples

In an embodiment, the processed electronic communication documents are saved with application server 140, configured to be a centralized place for interacting with such documents. For example, application server 140 can provide a centralized interface for accessing these documents by various computing devices 150A and 150B, for presenting these documents in a standardized format, and for allowing computing devices 150A and 150B to perform various actions which can lead to communication of data to devices 110A and 110B.

In an embodiment, application server 140 may allow users to register, create accounts, set up inboxes, and specify permission and configuration settings for their accounts. Permissions for different users can control the type of information available for viewing and the actions that can be performed. For instance, permissions or licenses can be issued to users for specific parsing of communication documents. Additionally, some users (referred to as customers) may opt out of certain features on the company information page. For example, under the AI features section, users can choose to "Enable AI to analyze emails to generate confirmations." Users with the "View emailed confirmations/Inbound Confirmations" permission can access the "Confirmation Inbox" data table. Moreover, different action items can be included for different users based on their permissions, such as forms (for example, an order form) that include information about legal terms.

Application server 140 allows customers to set up a Confirmation Inbox, providing the ability to configure an inbox specifically for receiving confirmations. This feature is designed to enhance the organization and management of email communications related to digital electronic purchase orders, invoices, or other documents relating to transactions in process or completed in relation to buyer computers and supplier computers. One implementation configures a Confirmation Inbox to receive email messages to a dedicated address like po_confirmations@<instancename>.exampledomain.com. Users with access to the Confirmation Inbox and a given user group can review all email content within the inbox, providing a centralized and efficient way to manage confirmation communications.

FIG. 1 shows that application server 140 provides an interface for displaying different records 1-N, which correspond to communications such as communication data 111A and 111B. Records 1-N may be arranged by identifying structural fields within each record (for example, structural fields 1-M are shown for record 2). An example of the arrangement of such records is shown in FIG. 2A.

Figure 2A:
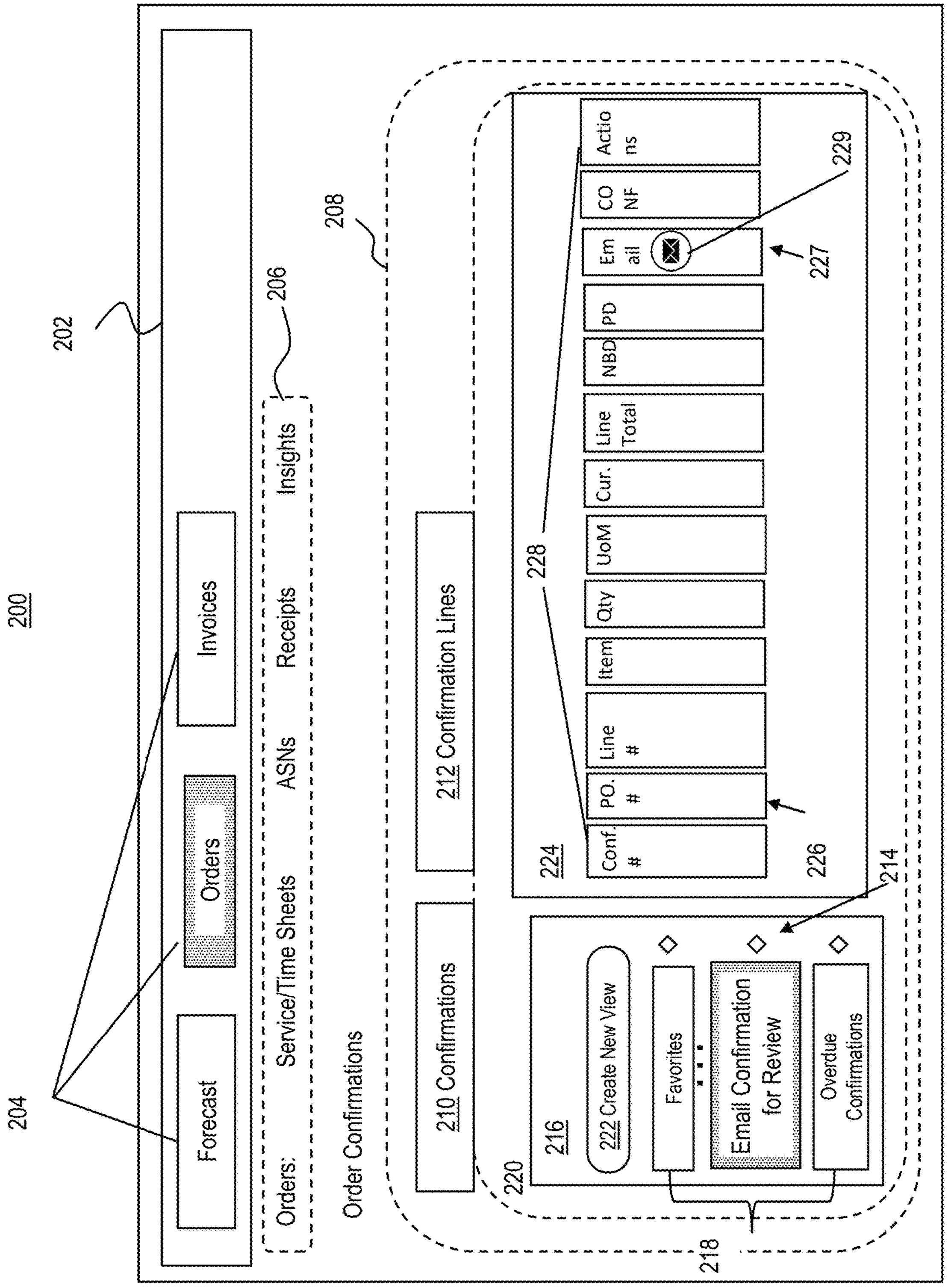
FIG. 2A and FIG. 2B illustrate example graphical user interfaces for presenting communication records on a computer display device in one embodiment.

FIG. 2A illustrates an example graphical user interface for presenting communication records on a computer display device in one embodiment. FIG. 2A illustrates interface 200 for managing order confirmations that application server 140 and SaaS application 144 have received via the inbox described above. In an embodiment, interface 200 is divided into sections programmed with graphical user interface (GUI) widgets for navigating, viewing, and managing confirmations for electronic documents such as emails. For example, interface 200 may include a Navigation Bar 202 at the top, which includes tabs 204 like "Forecasts," "Orders," and "Invoices," each programmed as an active hyperlink which, when selected, causes the SaaS application 144 to generate a new dynamic web page and transmit the page to one of the computing devices.

Further sub-tabs 206 under the "Orders" tab 205 may include Service/Time Sheets, Advance Shipping Notices (ASNs), Receipts, and Insights. An "Order Confirmations" section 208 includes a "Confirmations" widget 210 and a "Confirmation Lines" widget 212. In the example of FIG. 2A, the "Confirmation Lines" widget 212 has been selected, and, in response, the SaaS application 144 has generated the interface 220 with table 224 showing structured transaction confirmation data.

Additionally, the "Order Confirmations" section includes a sidebar 216 comprising a plurality of view widgets 218, which, when selected, cause the SaaS application 144 to generate updated web pages with different views of the data in table 224. Examples of views include Favorites (including Awaiting Your Review, Email Confirmations for Review, Pending Confirmations, Overdue Confirmations, Pending Integrations) and Others (including All Confirmations, Confirmation View). The highlighted "Email Confirmations for Review" indicates that the user is currently reviewing email confirmations.

In an embodiment, a "Create new view" button 222 is programmed, when selected, to cause the SaaS application 144 to open an interactive graphical dialog with structured fields that enable the user to specify a view. One or more icons 214 signify pending items in various views.

In an embodiment, the SaaS application 144 is programmed to display, in table 224, a list of email confirmation records 226, each of the records corresponding to a row of the table. The list of email confirmation records 226 includes a plurality of record values in a plurality of columns 228. Examples of values of columns 228 include Confirmation Number (Conf. #), Purchase Order Number (PO #), Line Number (Line #), Item Description (Item), Supplier, Quantity (Qty), Unit of Measure (UoM), Price, Currency (Cur.), Line Total, Needed By Date (NBD), Promised Date (PD), Email column 227, Confirmation Status (CONF) (such as "Supplier Proposed Changes" or "Supplier Cannot Fulfill") and Actions (icons for actions like review or accept). The "Actions" column allows users to perform actions such as reviewing or accepting changes.

In an embodiment, if a confirmation record 226 has an email message or other external communication associated with the record, email column 227 comprises an icon 229. Confirmation records 226 with no associated external communication can have the email column 227 blank or with a grayed-out icon and could represent manually entered confirmations or confirmations received via an external system. Email column 227 indicates an associated email, which can be previewed.

Figure 2B:
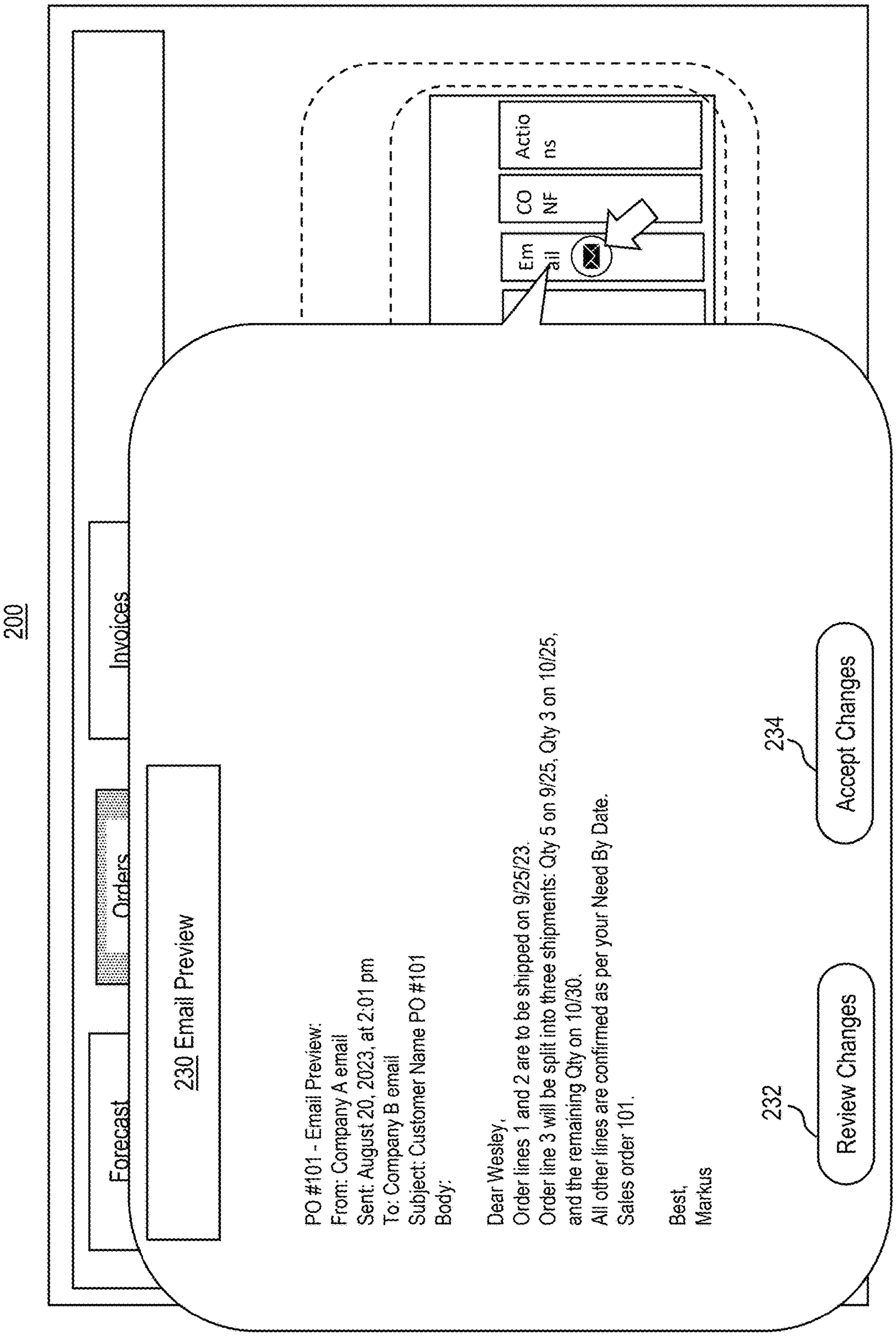

In an embodiment, the SaaS application 144 is programmed to display an email preview panel 230 in response to input from a computing device 110A, 110B signaling the selection of an icon 229 of a confirmation record 226 in table 224. Email preview pane 230 provides a detailed view of the email associated with a specific purchase order. It includes metadata such as the sender, recipient, date, subject, and email body. In FIG. 2B, an example of an email preview pane 230 shows details such as:

PO #101—Email Preview:
From: Company A email
Sent: Aug. 20, 2023, at 2:01 pm
To: Company B email
Subject: Customer Name PO #101
Body:
Dear Wesley,
Order lines 1 and 2 are to be shipped on Sep. 25, 2023.
Order line 3 will be split into three shipments: Qty 5 on 9/25, Qty 3 on 10/25, and the remaining Qty on 10/30.
All other lines are confirmed as per your Need By Date.
Sales order 101.
Best,
Markus The "Review Changes" button 232 and "Accept Changes" button 234 allow the user to take action directly from the preview pane. In this manner, a computing device 110A, 110B can rapidly and efficiently view an external communication that results in creating a particular confirmation record of Table 224.

Overall, interface 200 shown in FIG. 2A provides a centralized, organized way for users to manage confirmations related to purchase orders. FIG. 2A is only one possible representation of the types of communications and the type of organization possible. Similar approaches using machine learning models (MLMs) like MLM 132 and document processing models 136 can be used to organize electronic document data in other ways.

3. Process Flow Example

Figure 3:
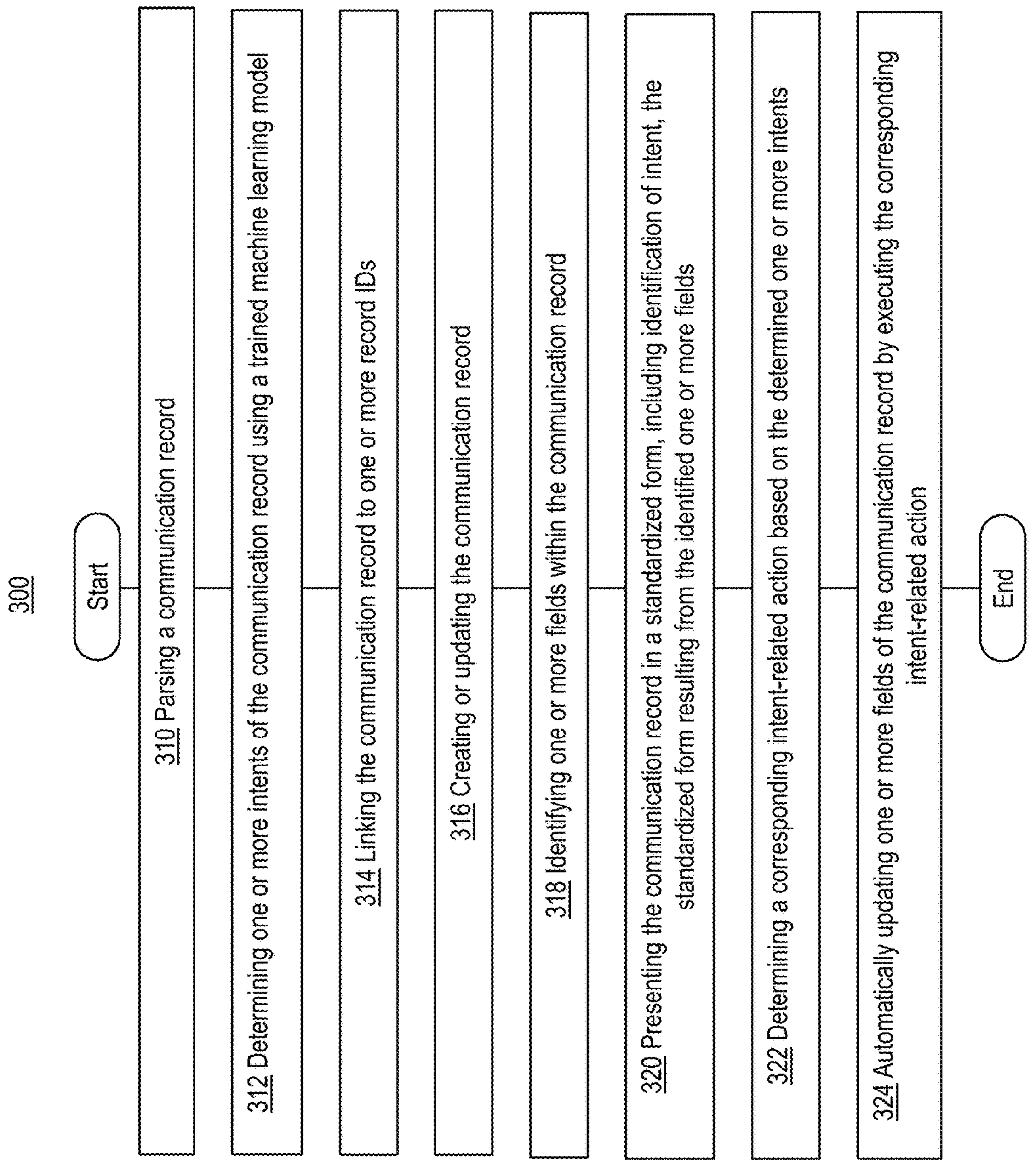
FIG. 3 is a flow diagram of an example computer-implemented method of using a trained machine-learning model for processing communication data in one embodiment.

FIG. 3 is a flow diagram of an example computer-implemented method using a trained machine-learning model to process communication records in one embodiment. FIG. 3 shows an example method 300 of presenting communication records in a standardized form and identifying intent in those documents. In an embodiment, SaaS application 144 is programmed to execute the steps of method 300 independently and in conjunction with the MLM 132 and/or document processing models 136.

SaaS application 144 can initiate the execution of program logic implementing FIG. 3 in response to determining that a new communication record is available for processing. Examples of communication records include emails, text messages, and transcripts of voicemails. For example, the SaaS application or application server 140 can be associated with a dedicated email inbox of a separate mail server or mail transfer agent programmed to generate an alert, event, notification, API call, or other programmatic message in response to receiving a new inbound message. Alternatively, the SaaS application 144 can be programmed to independently poll, read, or inspect a message queue, message bus, message repository, or database table of newly received messages. The same processing can be used for messages other than email.

At step 310, method 300 includes parsing an electronic document representing a communication record. In an embodiment, step 310 can comprise submitting the communication record to MLM 132. Parsing can comprise breaking the communication record into tokens, fields, items, parts, and similar components. In some cases, parsing can be accomplished using regular expressions, rule-based approaches, and similar techniques. Alternatively, parsing can be achieved using a large language model (LLM) to determine relationships between different text parts within the communication record. When the communication record is a voicemail or other item not comprising machine-readable digital text, step 310 can include pre-processing such as speech-to-text conversion or optical character recognition. It should be noted that not only electronic communication documents can be parsed, but other types of documents as well. For example, sourcing replies, order modifications, and invoices can be parsed. In some cases, any relevant attachments to the emails can also be parsed.

At step 312, method 300 may include determining one or more intents of the communication record by executing the inference stage of MLM 132 over the communication record, or over the tokens, fields, items, and parts obtained from the parsing, in combination with prompt and context data. For example, determining one or more intents may involve ascertaining whether the email's intent is to confirm an order. If MLM 132 cannot confirm this intent, the communication is marked as requiring further review by the user using a device such as computing device 150A or 150B.

To facilitate step 312, MLM 132 is trained to classify, predict, or otherwise identify the specific intent for each order or order line within a communication, such as an email, and output an intent value, alone or in combination with a confidence value. In an embodiment, if several lines within the communication include different intents, each intent is identified by the corresponding text line number and stored in a database (for example, a relational database) associated with application server 140. Each of the intents can be displayed in interface 200, with each line's intent distinguished based on the line numbers. For instance, when interface 200 is organized as a table, the "Line #" entry can differentiate between various intents within the same email. In one example implementation, MLM 132 is configured to capture three primary intents: "Confirmed," "Request to Cancel," and "Proposed Change."

At step 314, method 300 includes linking the communication record to one or more record identifiers (IDs). The record identifiers can include the order associated with the electronic document, such as a purchase order (PO) number. The electronic document can be marked for review if no order is identified, for example, if the communication cannot be linked to the record ID. These markings can be displayed in an interface such as interface 200, as shown in FIG. 2A. In cases where multiple orders are referenced within a single electronic document, such as an email, method 300 at step 314 is designed to link text related to each order with its corresponding ID. Additionally, in some instances, the SaaS application 144 is programmed to execute the inference stage of the MLM 132 to classify text as corresponding to a specific order. For example, during the inference stage, MLM 132 can receive a line of text as input and classify it as belonging to a particular order. Such portions of text are then displayed separately for each order in interface 200 with the provided email information.

If orders are identified (for example, if a PO number is determined for each order), MLM 132 is configured at step 316 to create or update an order confirmation object, which may include data from the communication record associated with an electronic document. If the communication record includes several orders with multiple numbers of electronic documents, a corresponding number of order confirmation objects will be created, each for its respective electronic document number. These order confirmation objects have an associated confirmation document and include data fields that can be displayed as a record within interface 200. The data fields of order confirmation objects within the confirmation document pertain to a particular transaction associated with a specific electronic document number. For example, these data fields can include the type of product or services delivered, delivery dates for such products or services, the number of items delivered, pricing details, item descriptions, order status (for example, confirmed, pending, canceled), shipment tracking numbers, supplier contact information, terms of payment, invoicing details, delivery locations, special instructions or notes, and any other information related to the order corresponding to a particular electronic document number. Each record within interface 200 may correspond to a specific order confirmation object.

In various embodiments, the SAS application 144 can support creating order confirmation objects and updating confirmation documents associated with order confirmation objects with the intent at the line level. When the intent involves an edit or order change, as determined, for example, by the inference stage of the MLM 132, SAS application 144 is configured to examine the fields the suppliers want to modify, which may include dates, prices, quantities, items (out of stock), and other elements. Any identified changes are applied to the individual confirmation lines. In all cases, a message indicates that the end user must review the changes before submitting the confirmation.

Once the email is processed and a confirmation document is created or updated by SaaS application 144, it is digitally stored in a review queue for further processing. In an embodiment, the SaaS application 144 is programmed to create and manage a virtual queue for each user account registered with the system. The SaaS application 144 is also programmed to record the history, noting that the confirmation was created or updated, and to attach the email to the confirmation document.

When handling multiple electronic documents, such as emails, for the same order or other electronic documents, the emails are processed in the order they are received, based on the "Received date." A document corresponding to the order may be created using, for example, a template specific to that type of order. This document may be updated as each subsequent email is parsed. Interface 200 is configured to display the number of emails associated with the document for review, starting with the latest version.

For emails referencing more than one order, ML 131 is configured to identify all orders and prepare confirmation documents as entries in interface 200 for confirming each order. The confirmation documents are created or updated for every order identified, ensuring that each order is accurately processed and documented.

Additionally, at step 318, method 300 includes identifying one or more fields within the communication record. These fields may correspond to the columns of the table in interface 200. For example, presenting the communication record in a standardized form may include presenting order confirmation objects within interface 200. Interface 200 can include a table, as described above, with table rows corresponding to the order confirmation objects and table columns corresponding to the fields associated with the order confirmation objects. The fields can include dates, prices, quantities of items, types of items, descriptions of items, confirmation numbers, purchase order numbers, line numbers within the email describing the order, supplier names, units of measure, needed by dates, promised dates, shipment statuses, shipment dates, expected arrival dates, confirmation statuses (such as "Supplier Proposed Changes" or "Supplier Cannot Fulfill"), actions, and other relevant fields (for example, contact information such as email addresses, phone numbers, and mailing addresses). Once the fields are identified, the communication is parsed and stored based on these fields. The process of parsing the communication into different structural components is further described below.

After completing step 318, method 300 proceeds to step 320, which involves presenting the communication record in a standardized form. This presentation includes identifying intent based on the identified fields. Such a presentation may be displayed through interface 200, as shown in FIG. 2A.

At step 322, method 300 involves determining a corresponding intent-related action based on the identified intents. These intent-related actions are determined by analyzing instructions from a user of application server 140. The user provides instructions for managing and reviewing the communication-related data presented within interface 200. Such instructions can include confirming changes to an order. Confirmation can be accomplished via interface 200, which can present an "Email Confirmation for Review" view interface available in the Orders data table or Order Confirmation data table. This table contains orders or confirmations that require review, displaying columns such as Order #, Order Confirmation #, Supplier #, Status, Date of email, Email sent by, Email (Preview of email), and # of days pending review. The data displayed in this view is restricted by the underlying data security of the document. With the proper security certification, the user can view and confirm changes to an order.

Alternatively, users can view emails from the order lines confirmation data table, which includes columns such as Order #, Supplier #, Order Confirmation #, Line #, Qty, Need by Date, Promised Date, Promised Deliveries, Price, Confirmation Status, Date of Email, Email Sent By, Email (Preview of Email), and # of Days Pending Review. Interface 200 allows users to click on a confirmation, which navigates them to the confirmation page. Here, users can see a document status bar with instructions to review and submit emails on behalf of the supplier. A preview pane displays the email that created the confirmation, including any attachments.

In various cases, intent-related actions can be automatically determined. In one embodiment, determining intent-related actions may leverage a machine learning model (MLM) trained on historical interactions between specific buyers and suppliers. The MLM may be configured to analyze past behaviors, preferences, and responses to various order changes to predict intent-related actions automatically. For instance, if a buyer typically accepts small price changes but frequently disputes delivery date changes, the system could automatically determine an appropriate response based on these past interactions. The model would also take into account the relationship history, such as long-term partnerships or first-time transactions, to fine-tune intent-related actions. Additionally, it could analyze factors like communication tone, urgency of the order, or even external market conditions (e.g., supply chain disruptions) to adjust the determined action. By learning from past outcomes, the system ensures that responses are tailored to each buyer and supplier, providing a more accurate, personalized interaction.

Some examples, based on historic interactions can include price negotiation trends, supplier performance history, buyer's reactions to product substitutions, payment term modifications, reactions to shipping changes.

For price negotiation trends, if historical data shows that a specific buyer usually accepts a 5% price increase without negotiation but disputes any increase beyond that threshold, the MLM could automatically confirm a price increase up to 5%. However, if the price increase exceeds this threshold, the system would trigger an intent-related action to request a formal negotiation or reject the increase outright.

For supplier performance history, if a supplier frequently delivers ahead of schedule and the buyer generally appreciates this by confirming orders without delay, the MLM could predict an automatic confirmation of early delivery in future orders. Conversely, if a supplier has a history of late deliveries, the system might automatically send a request for expedited shipping or demand a penalty payment based on past agreements.

In regard to buyer's reactions to product substitutions, if a buyer has previously accepted product substitutions (e.g., an alternative model or brand) without much resistance for low-value orders, the MLM could automatically approve substitutions for similar low-value orders in the future. However, if past records show that the buyer rejects substitutions for high-value or critical items, the MLM may automatically reject such substitutions for high-priority orders.

In regard to payment term modifications, if a specific buyer has a history of requesting extensions to payment terms, such as an additional 15 days to pay an invoice, and the supplier has granted these requests in the past, the MLM could automatically approve payment term extensions under similar circumstances. However, if the supplier has rejected payment term extensions for large, one-time purchases, the system would automatically deny such requests for similarly large transactions.

In regard to reactions to shipping changes, if the buyer has historically accepted minor changes in the delivery window (e.g., delays of 1-2 days) but has escalated issues when the delay exceeds 3 days, the MLM could automatically confirm shipping changes that fall within the acceptable window. For delays exceeding the usual tolerance, it could escalate the issue by requesting compensation, alternative shipping methods, or even cancelling the order.

In some cases, to determine intent-related action automatically, a suitable MLM can classify each order into a specific category based on predefined criteria such as order size, product type, lead time, or urgency. A decision tree algorithm, or a similar classification technique, could be used to determine the category. For example, an order involving large quantities with tight deadlines might be categorized as "High Priority," whereas smaller, recurring orders could fall under "Routine." Once categorized, the system would trigger intent-related actions that are typical for that category. For a "High Priority" order, the system might automatically prioritize updates, confirm changes quickly, or flag delays for immediate escalation. In contrast, a "Routine" order might trigger more standard actions, such as sending a confirmation email without further review. This categorization system allows for efficient and scalable handling of different order types, reducing manual intervention and ensuring the appropriate response for each scenario.

Further, in some cases, to determine intent-related action automatically, a suitable MLM can adapt the intent-related action based on real-time data and evolving circumstances. Rather than relying on static intent-related actions, the MLM can continuously monitor patterns and adjusts the intent-related actions accordingly. For example, if a supplier repeatedly changes the delivery date for an order, the initial intent-related action may be to "agree and confirm." However, as changes continue to occur beyond an acceptable threshold (which could be defined based on business rules or historical data), the system might escalate the response, such as "request a price reduction due to the supplier's repeated inability to meet deadlines." This dynamic approach ensures that the system's responses remain relevant and appropriate, considering not just the present action but the cumulative impact of ongoing changes. Other scenarios could include adapting the intent to ask for faster shipping or modifying the payment terms to reflect frequent adjustments made by the supplier. By enabling real-time, data-driven decisions, the system remains responsive to fluctuating conditions, providing more accurate and strategic management of orders.

At step 324, method 300 involves automatically updating one or more fields of the communication record by executing the corresponding intent-related action. In some instances, step 324 may be optional. When automatically updating the communication record, any relevant fields can be adjusted based on the executed intent-related action. For example, if the intent-related action is confirming an order, a field indicating order confirmation or rejection is updated to reflect that the order has been confirmed. Similarly, if the intent-related action involves rejecting the order, the appropriate field will be updated to indicate that the order has been rejected. In cases where the intent-related action is conditional, such as confirming the order subject to a price reduction (e.g., by 10 percent), both the price field and the order status field will be updated accordingly. Other parameters of the communication record may also be adjusted based on the specific conditional requirements, such as quantity of items, shipping date, payment terms, delivery method, discount rates, tax adjustments, or the status of any approvals or verifications. These updates ensure that all relevant aspects of the order are accurately reflected in the communication record.

It should be understood that confirming or rejecting an order are relatively straightforward intent-related actions, whereas more complex intent-related actions-such as those based on multiple conditions—can also be determined and executed. In various cases, as intent-related actions are carried out to automatically update one or more fields of the communication record, these actions may involve scripts, programs, or other suitable computer-executable instructions. When executed by a processor, these instructions result in the automatic updating of relevant fields within the communication record. Such updates may be based on a wide range of conditions or criteria, allowing for more sophisticated intent-based processing in complex scenarios.

Figure 4:
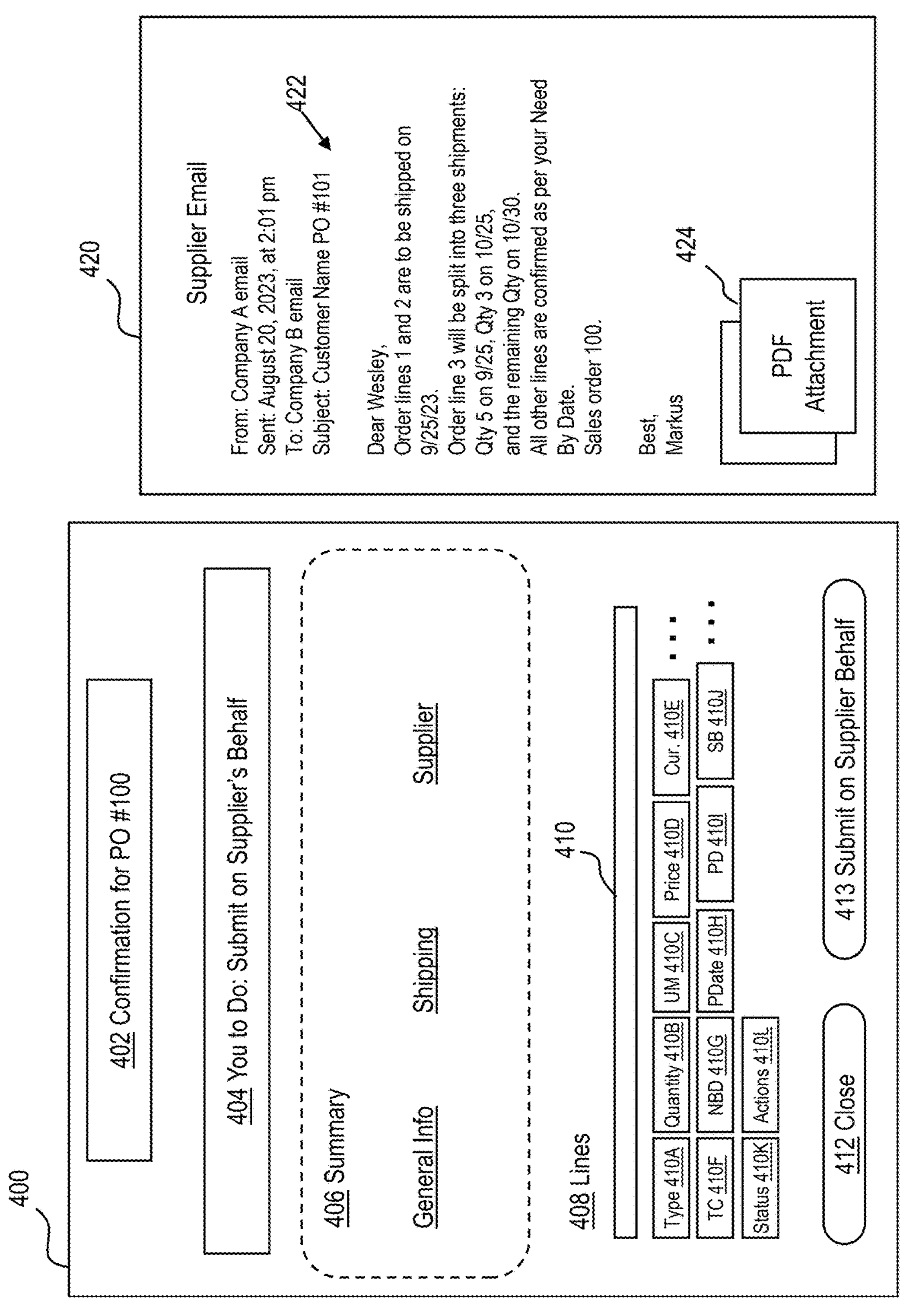
FIG. 4 illustrates an example graphical user interface for presenting communication data on a computer display device in one embodiment.

FIG. 4 illustrates an example graphical user interface for presenting communication data on a computer display device in one embodiment. FIG. 4 illustrates an example of a preview pane 400 and a supplier email 420 related to the preview pane. In an embodiment, the preview pane comprises a title 402, a notification 404, a summary panel 406, a lines panel 408 having a data table 410, and action buttons 412 and 413. The preview pane 400 is programmed for confirming purchase order (PO) #100 and can be displayed to or receive input from computing devices 150A, 150B of application server 140 (as shown in FIG. 1) to review and submit order confirmations on behalf of suppliers or other entities associated with computing devices 110A, 110B. In an embodiment, the supplier email 420 related to the preview pane 400 comprises a content section 422 and an attachment 424.

A header of preview pane 400 may include the title "Confirmation for PO #100" and an instruction section indicating the need to submit the confirmation on the supplier's behalf, noting that the email was converted to a draft confirmation on a specific date. The summary panel 406 provides general information about the order, shipping details, and supplier information. The lines panel 408 contains data table 410 listing items and related details such as type 410A, quantity 410B, unit of measure (UM) 410C, price 410D, currency 410E, total cost (TC) 410F, needed by date (NBD) 410G, promised by date (PDate) 410H, promised deliveries (PD) 4101, supplier and buyer reasons (SB) 410J, status 410K, and actions 410L. Each line item can have statuses like "Supplier Proposed Changes" or "Confirmed" and possible actions indicated by icons.

In various embodiments, type 410A specifies the type or category of the item being ordered, quantity 410B indicates the number of units ordered for each item, UM 410C shows the unit of measurement used for the quantity, such as pieces, kilograms, or liters, price 410D displays the unit price of the item, currency 410E specifies the currency in which the price is denominated, and TC 410F represents the total cost for the item, calculated by multiplying the quantity by the unit price. Further, NBD 410G indicates the date by which the item is required to be delivered, PDate 410H reflects the date the supplier has promised to deliver the item, PD 4101 provides information about the number of deliveries promised by the supplier, and SB 410J records any reasons provided by the supplier or buyer, possibly related to delivery schedules, changes, or other considerations. Additionally, status 410K shows the current status of the item in the order process, such as pending, confirmed, or shipped, and actions 410L lists the available actions related to each item, such as reviewing or accepting changes.

The supplier email section displays the email content, including metadata (from, sent date, to, subject) and the email body, which outlines the order details and shipping schedule. A PDF attachment section indicates associated documents provided by the supplier. Action buttons "Close" 412 and "Submit on Supplier Behalf" 413 allow the user to close preview pane 400 or submit the confirmation. The preview pane 400 is designed to streamline the process of reviewing and confirming purchase orders, ensuring accuracy and completeness by presenting all necessary information in a structured manner. It facilitates easy decision-making and status tracking, enhancing efficiency in managing order confirmations.

4. Transaction Record Update

In an embodiment, when changes to an order are presented in the communication record and are manifested in the data associated with the order confirmation object due to a request from a supplier (for example, devices 110A and/or 110B), these changes may be accepted by a user of application server 140 (for example, computing devices 150A and/or 150B) by confirming acceptance, rejected by the user by confirming rejection or accepted by the user with a particular set of conditional changes by confirming acceptance with conditional requirements. For example, when accepted via input from one of the devices with conditional requirements, the conditional requirements may include changes to the price, changes to the number of items delivered, changes to the delivery date, a combination thereof, or any other changes to the order.

Examples of intent-related actions determined, for example, by method 300 at step 322 include: confirming acceptance of an order, confirming acceptance of a change in the order, rejecting an order, rejecting a proposed change to the order, and confirming acceptance of a change in the order based on specified conditions. Such conditions may include, but are not limited to a price change, a quantity change, a change in delivery date, a modification to payment terms, a change in shipping method, a substitution of products or services, compliance with specific contractual obligations, verification of inventory availability, customer credit approval, meeting a minimum order threshold, adherence to regulatory requirements, or achieving required approval from upper management. Additional examples can include requesting clarification on an order, requesting a revision to the terms, placing the order on hold pending further review, or modifying delivery schedules or quantities in response to updated requirements.

Users with edit permissions can edit the confirmations and submit them, thus, providing instructions related to managing and reviewing the communication-related data. After submission, users receive a warning to confirm the details before finalizing the submission. The details can include checking for the title or checking that the details in the processed document match your expectations before submission.

In cases where an email is incorrectly associated with an order confirmation, users can submit instructions to disassociate the email and either send it to the Confirmation Inbox or associate it with a new purchase order. If an email is disassociated, any changes to the confirmation draft will be removed. If there are no other emails or edits, the confirmation document will be archived, but changes from those should persist if there are other emails.

In some cases, when a communication record cannot be processed by MLM 132 with a confidence value above an acceptable threshold, the record can be displayed within a graphical user interface with a marking, requiring the user to adjust at least some of the data within that communication record (for example, adjust the PO number or adjust supplier information) so that the data can then be processed by MLM 132. In such cases, user actions may include adjusting the communication record and requesting MLM 132 to further process the record.

For managing the Confirmation Inbox, users with the "View Confirmation Inbox" permission are configured by application server 140 to have access to a dedicated inbox under the Orders menu. This inbox allows users to view all emails received by that particular inbox. The confirmation inbox page identifies details such as Email Entry #, the inbox name where the email was received, the status of processing (Received, Pending processing, Processed, Pending review, Error), sender's email, date received, attachments, email preview, document ID, and links to confirmations that are updated. Actions available include downloading the email, associating it with a PO, or detaching it from a PO. When associating an email with a PO, an interface is presented for the user to identify and link the email to an eligible purchase order.

Figure 5:
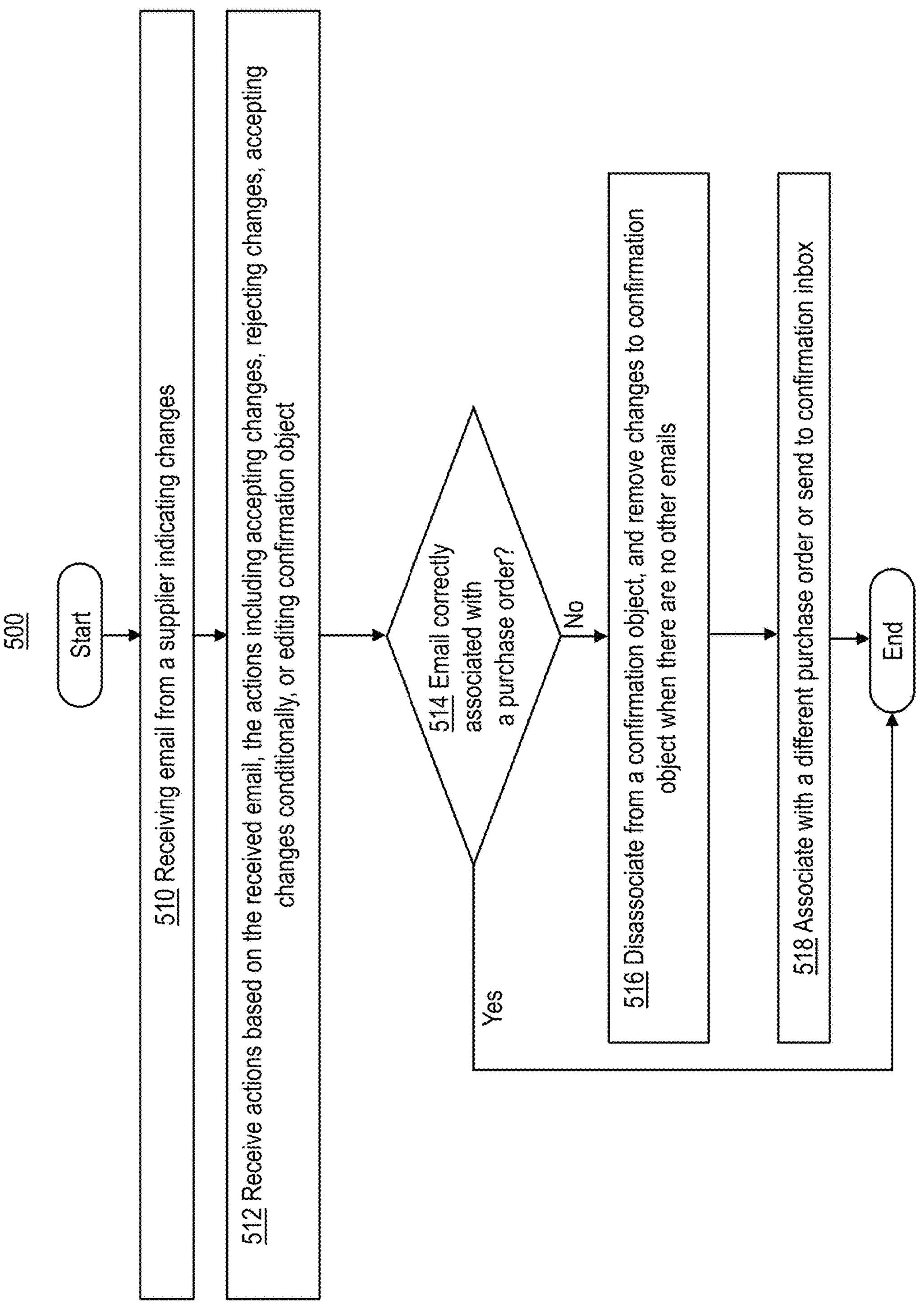
FIG. 5 is a flow diagram of an example computer-implemented method of updating a transaction record in one embodiment.

FIG. 5 illustrates an example of a computer-implemented method 500 that utilizes a trained machine-learning model to update a transaction record. In various cases, at least some parts of the transaction record may be updated automatically based on the changes in an email received from a supplier. In various cases, method 500 can be executed by the SaaS application 144.

At step 510, SaaS application 144 receives an email from a supplier, which may indicate changes to an order, such as modifications to the shipping date, expected arrival date, the number of items shipped, or substitutions for items in the order. At step 512, SaaS application 144 presents an interface to the user, allowing them to take action based on the information in the received email. These actions may include accepting the changes, rejecting them, or accepting them conditionally. In various scenarios, SaaS application 144 is designed to provide a graphical user interface that facilitates user interaction with appropriate actions, such as buttons, widgets, and other interactive elements.

Conditional acceptance of changes allows for flexibility in managing order modifications while ensuring that specific terms are met. For example, a user might accept a supplier's proposed increase in the quantity of items shipped, but only on the condition that the price per unit remains the same or that a discount is applied to future orders. If the supplier requests a change in the delivery date, the user might agree to the new date, provided that the supplier expedites shipping at no additional cost to meet a critical deadline. In cases where a substitute item is offered, the user could accept the substitution, but only if it meets specific quality standards or if the supplier provides a sample for approval before finalizing the change. Similarly, if the supplier suggests an increase in order quantity, the user might agree, but only for certain items, or might require the additional items to be delivered in a separate shipment. Additionally, the user might accept changes that result in a delayed delivery, but only if the payment terms are adjusted accordingly, such as delaying payment until after delivery is completed. Also, the user might conditionally accept changes only if the supplier provides updated documentation, like new packing lists or certificates of compliance, to ensure the changes are accurately reflected.

In some cases, for recurring orders from a particular supplier, a response for conditional acceptance may be generated automatically using a machine learning model, such as a large language model (LLM). In some cases, such a response may be based on a template response. The LLM can analyze historical transactions and determine the most effective update based on past interactions. For example, if a supplier frequently delays deliveries and consistently agrees to a lower price in return for late deliveries, the system can automatically suggest a specific reduced price for the delayed items and update the confirmation object accordingly. This automatic update may include an indicator for the user to review, ensuring the changes align with expectations. Similar automatic updates can be generated based on patterns of successful adjustments from previous transactions, such as adjusting delivery timelines for additional discounts, modifying order quantities based on the supplier's historical performance, or applying specific terms and conditions that have proven effective in past dealings with that supplier.

The SaaS application 144 also provides an interface for editing confirmation objects associated with the received email. These editing capabilities include commands that can be executed at step 512 by the SaaS application 144, allowing users to modify the details of the confirmation object. The confirmation object typically presents order data in a table format, which includes various entities to help users manage and review the order details effectively.

The table format within the confirmation object includes several key data points such as the email entry number, the name of the inbox where the email was received, and the status of processing, which can indicate stages like "Received," "Pending processing," "Processed," "Pending review," or "Error." Additional information provided includes the sender's email address, the date the email was received, any attachments, a preview of the email, the document ID, and links to any updated confirmations. The interface also provides actionable options like downloading the email, associating it with a purchase order (PO), or detaching it from an existing PO.

In some cases, when performing an action such as accepting, rejecting, or conditionally accepting changes, the confirmation is submitted through an appropriate interface provided by the SaaS application 144. Before submission, the application may present the user with a warning or checklist. This prompt could include reminders to verify the title of the confirmation object and ensure that the details in the processed document align with the user's expectations. The interface may offer options such as "Yes, Continue" or "No, Cancel" to confirm or cancel the submission.

At step 514, method 500 determines whether the email is correctly associated with a PO. This determination may be performed by a suitable machine learning model, such as MLM 132. For example, MLM 132 can compare the information within the email with the details in the confirmation object associated with the PO to assess whether the email has been correctly linked to the corresponding PO. If the email is correctly associated with the PO (step 514, Yes), method 500 concludes. However, if the email is not correctly associated with the PO (step 514, No), method 500 proceeds to step 516, where the email is first disassociated from the confirmation object. Additionally, any changes to the confirmation object related to the disassociated email are removed if there are no other emails associated with that confirmation object. If no other emails or changes are linked to the confirmation object, it is archived. If, however, there are other emails, changes resulting from those emails are reflected in the confirmation object.

At step 518, method 500 provides the option to associate the email with a different purchase order. This option may be presented as an action through the interface of the SaaS application 144. Alternatively, the email can be redirected to a confirmation inbox. A new confirmation object is then created either after the email is associated with a different purchase order or when it is sent to the confirmation inbox.

When the user selects the action to associate the email with a purchase order at step 518, the SaaS application 144 presents a modal dialog, allowing the user to identify the appropriate order and establish the association. It is important to note that only purchase orders eligible for confirmation will be searchable within this interface, ensuring that users can only link emails to relevant and valid orders. After completion of step 518, method 500 completes.

5. Design Approach

The design approach for an MLM such as MLM 132, as shown in FIG. 1, involves several steps to process and extract data from electronic documents, such as emails, thereby creating or updating order confirmations. Initially, emails stored in the received_emails table will have a corresponding record created in the email_extractions table with a pending status. The processing occurs in two levels. The first level (existing process) extracts email content and generates previews and PDF files, potentially extending to process attachments. The second level (new process) involves processing records in the order_confirmation_emails table by sending the email text body to a Large Language Model (LLM) via a microservice.

Each record in the email_extractions table is processed by the LLM to extract purchase order (PO) numbers and line details, such as number, description, price, quantity, need_by_date, total, and schedules. Upon successful processing, the record's status is updated to "completed"; if it fails, the status is marked as "failed." When a PO number is identified and matched with a confirmable PO number in the enterprise system, a new confirmation is created, or changes are applied to existing draft lines. If the extracted line number matches the PO's line number, all confirmable attributes are updated with the extracted data. If there is no match, the order confirmation remains unchanged for manual review by the user of application server 140 (as shown in FIG. 1). Line-level matching may be expanded to include attributes like descriptions.

When an email-extracted confirmation is modified, these changes are tracked as feedback in the email_extractions table using a feedback column of type integer (enum).

If a buyer draft exists, changes from the email will be applied to the lines confirmed in the email. If a supplier draft exists, a buyer draft will be created, and email confirmation changes will be applied. The draft confirmation that is submitted first will archive the other confirmation. The confirmation header and lines will be archived if a confirmation exists in any non-terminal status other than the supplier or buyer draft. Multiple emails can be associated with the same PO. One email can have multiple PO confirmations. If an email is incorrectly associated with a PO, it can be remapped, causing the existing confirmation to be archived and a new confirmation created for the PO that is now mapped to the remapped email.

The feedback mechanism is crucial for ensuring the accuracy and continuous improvement of MLM 132 and/or document processing models 136. It is designed to capture discrepancies between the extracted and expected data, helping refine and enhance the system's performance over time. Three types of feedback mechanisms are considered:

Basic Feedback: This is the simplest form of feedback, where the system merely notes whether there was a mismatch in the extracted data. It does not capture any specific details about what was mismatched, only indicating that a discrepancy exists. This type of feedback is useful for identifying that an issue occurred without delving into the specifics.

Diff-Based Feedback: In this approach, application server 140 is configured to store the differences (or "diffs") between the data extracted by MLM 132 and/or document processing models 136 and the expected data for each attribute that did not match. This method is similar to how revision records store changes, allowing the system to log exactly what was different. For example, if the extracted price differs from the expected price, the system records this difference. This type of feedback provides more granular information than basic feedback, making it easier to understand and address specific mismatches.

Full Data Feedback: This is the most comprehensive type of feedback. Application server 140 is configured to capture the expected data in the same format as the data extracted by MLM 132 and/or document processing models 136, allowing for a detailed comparison later. With full data feedback, application server 140 can run manual or automated comparisons between the extracted and expected data to identify discrepancies. This feedback provides the most detailed information, which can be used to fine-tune the MLM 132 and/or document processing model 136 for better accuracy.

The feedback mechanisms described herein can continuously improve MLM 132 and/or document processing models 136. By systematically capturing and analyzing mismatches, application server 140 can identify error patterns, which can then be addressed through retraining or adjusting the parameters of MLM 132 and/or document processing models 136.

In various cases, when structurally organizing information in communication data, such as emails, MLM 132 can be configured to receive as a prompt a JSON format file detailing different fields that can be populated when processing a particular email. Example JSON prompt files are summarized below as JSON prompt 1 and JSON prompt 2.

JSON prompt 1:

```
{
  “$schema”: “http://json-schema.org/draft-07/schema#”,
  “type”: “object”,
  “properties”: {
    “orders”: {
      “type”: “array”,
      “items”: {
        “type”: “object”,
        “properties”: {
          “order__number”: { “type”: “string” },
          “order__header__id”: { “type”: “integer” },
          “order__header__version__id”: { “type”: “integer” },
          “order__status”: { “type”: “string”, “instruction”: “Possible values; confirmed, cancelled,
rejected, pending__supplier__action, pending__buyer__action).” },
          “supplier__name”: { “type”: “string” },
          “supplier__number”: { “type”: “string” },
          “supplier__site”: { “type”: “string” },
          “order__lines”: {
            “type”: “array”,
            “items”: {
              “type”: “object”,
              “properties”: {
                “id”: { “type”: “integer” },
                “version”: { “type”: “integer” },
                “number”: { “type”: “string” },
                “catalog__item__name”: { “type”: “string” },
                “catalog__item__number”: { “type”: “string”},
                “manufacturer__name”: { “type”: “string”},
                “manufacturer__part__number”: { “type”: “string” },
                “supplier__part__number”: { “type”: “string” },
                “supplier__aux__part__number”: { “type”: “string”},
                “contract__number”: { “type”: “string” },
                “description”: { “type”: “string” },
                “quantity”: { “type”: “integer” },
                “uom”: { “type”: “string” },
                “price”: { “type”: “number” },
                “currency__id”: { “type”: “integer” },
                “currency__code”: { “type”: “string” },
                “supplier__delivery__confirmation”: { “type”: “string”, “instruction”: “Possible values;
cannot__fulfill, can__fulfill, proposed__change” },
                “promised__date”: { “type”: “string”, “description”: “The expected delivery date of the
order line.” },
                “schedule__lines”: {
                  “type”: “array”,
                  “items”: {
                    “type”: “object”,
                    “properties”: {
                      “quantity”: { “type”: “integer” },
                      “delivery__date”: { “type”: “string” }
                    },
                    “required”: [“quantity”, “delivery__date”]
                  },
                  “description”: “Details of the delivery schedule for the order line.”
                }
              },
              “required”: [
                “id”, “number”, “description”, “uom”, “promised__date”
              ]
            }
          }
```

-continued

```
            },
            “required”: [
              “order_number”, “order_lines”
            ]
          }
        }
    },
    “required”: [“orders”],
    “description”: “A collection of orders.”
}
```

JSON prompt 2:

```
{
    “$schema”: “http://json-schema.org/draft-07/schema#”,
    “type”: “object”,
    “properties”: {
      “order_number”: { “type”: “string”, “description”: “The unique identifier for the order.” },
      “order_header_id”: { “type”: “integer”, “description”: “The identifier for the order header.” },
      “order_header_version_id”: { “type”: “integer”, “description”: “The version identifier for the
order header.” },
      “order_status”: { “type”: “string”, “description”: “The status of the order. Possible values;
confirmed, pending_supplier_action, pending_buyer_action).” },
      “supplier_name”: { “type”: “string”, “description”: “The name of the supplier.” },
      “supplier_number”: { “type”: “string”, “description”: “The supplier’s unique identifier.” },
      “supplier_site”: { “type”: “string”, “description”: “The supplier’s site information.” },
      “order_lines”: {
        “type”: “array”,
        “items”: {
          “type”: “object”,
          “properties”: {
            “id”: { “type”: “integer”, “description”: “The identifier for the order line.” },
            “version”: { “type”: “integer”, “description”: “The version identifier for the order line.” },
            “number”: { “type”: “string”, “description”: “The unique identifier for the order line.” },
            “catalog_item_name”: { “type”: “string”, “description”: “The name of the catalog item.” },
            “catalog_item_number”: { “type”: “string”, “description”: “The number associated with the
catalog item.” },
            “manufacturer_name”: { “type”: “string”, “description”: “The name of the manufacturer.”
},
            “manufacturer_part_number”: { “type”: “string”, “description”: “The manufacturer’s part
number.” },
            “supplier_part_number”: { “type”: “string”, “description”: “The supplier’s part number.” },
            “supplier_aux_part_number”: { “type”: “string”, “description”: “Additional supplier part
number.” },
            “contract_number”: { “type”: “string”, “description”: “The contract number associated with
the order line.” },
            “description”: { “type”: “string”, “description”: “The description of the ordered item.” },
            “quantity”: { “type”: “integer”, “description”: “The quantity of the ordered item.” },
            “uom”: { “type”: “string”, “description”: “The unit of measure for the ordered item.” },
            “price”: { “type”: “number”, “description”: “The price per unit of the ordered item.” },
            “currency_id”: { “type”: “string”, “description”: “The identifier for the currency.” },
            “currency_code”: { “type”: “string”, “description”: “The code representing the currency.”
},
            “supplier_delivery_confirmation”: { “type”: “string”, “description”: “Fulfillment status of
the order line. Possible values; cannot_fulfill, can_fulfill, proposed_change” },
            “delivery_date”: { “type”: “string”, “format”: “date-time”, “description”: “The expected
delivery date of the order line.” },
            “schedule_lines”: {
              “type”: “array”,
              “items”: {
                “type”: “object”,
                “properties”: {
                  “quantity”: { “type”: “integer”, “description”: “The quantity scheduled for delivery.” },
                  “delivery_date”: { “type”: “string”, “format”: “date-time”, “description”: “The
scheduled delivery date.” }
                },
                “required”: [“quantity”, “delivery_date”],
                “description”: “Details of the delivery schedule for the order line.”
              }
            }
          },
          “required”: [
            “id”, “version”, “number”, “catalog_item_name”, “catalog_item_number”,
            “manufacturer_name”, “manufacturer_part_number”, “supplier_part_number”,
            “supplier_aux_part_number”, “contract_number”, “description”,
            “quantity”, “uom”, “price”, “currency_id”, “currency_code”,
            “fulfilment”, “delivery_date”, “schedule_lines”
          ],
          “description”: “Details of an order line, including item information and delivery schedules.”
```

-continued

```
      }
    }
  },
  "required": [
    "order_number", "order_header_id", "order_header_version_id",
    "order_status", "supplier_name", "supplier_number", "supplier_site",
    "order_lines"
  ],
  "description": "Details of an order, including header information and order lines."
}
```

In an embodiment, MLM 132 may be configured to follow the instructions provided in the JSON schema and respond with a JSON object that excludes fields not found in the email. An example requirement can be that all dates should be in the format YYYY-MM-DD, and times should follow the HH: MM format in UTC. The JSON schema serves as a template for organizing the extracted information. It defines the structure for general order information, supplier details, and specifics about each order line. The schema includes fields like the order number, order header ID, order status, and supplier information for each order. Each order can have multiple lines, and each line has its own details, such as item ID, description, quantity, price, and delivery dates. The schema also specifies that only the required fields should be included in the response when the email does not provide certain data.

MLM 132 is configured to process the email by reading its content, extracting the relevant details, and filling them into the corresponding fields in the JSON template. For example, if the email's subject is "Order confirmation for ORDER #4956458" and the body states "Classic ORDER #4956458 High-quality wristwatch. 100 items. We're on it . . . ", MLM 132 is configured to identify the order number and any other relevant details from the email content. It then populates the JSON template with this information. If some details are missing from the email, those fields remain null or are omitted from the final JSON output. The result is a JSON object that organizes the extracted data in a clear and structured manner, making it easier to process and review order confirmations. For instance, for the above example, the JSON can be:

```
{
  "orders": [
    {
      "order_number": "4956458",
      "order_lines": [
        {
          "id": 1,
          "number": "1001",
          "description": "High-quality wristwatch",
          "uom": "items",
          "promised_date": "2023-09-25T00:00:00Z"
        }
      ]
    }
  ]
}
```

In this example, "2023-09-25T00:00:00Z" stands for midnight (the start of the day) on Sep. 25, 2023, in the UTC time zone.

5. Implementation ExampleHardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may also combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
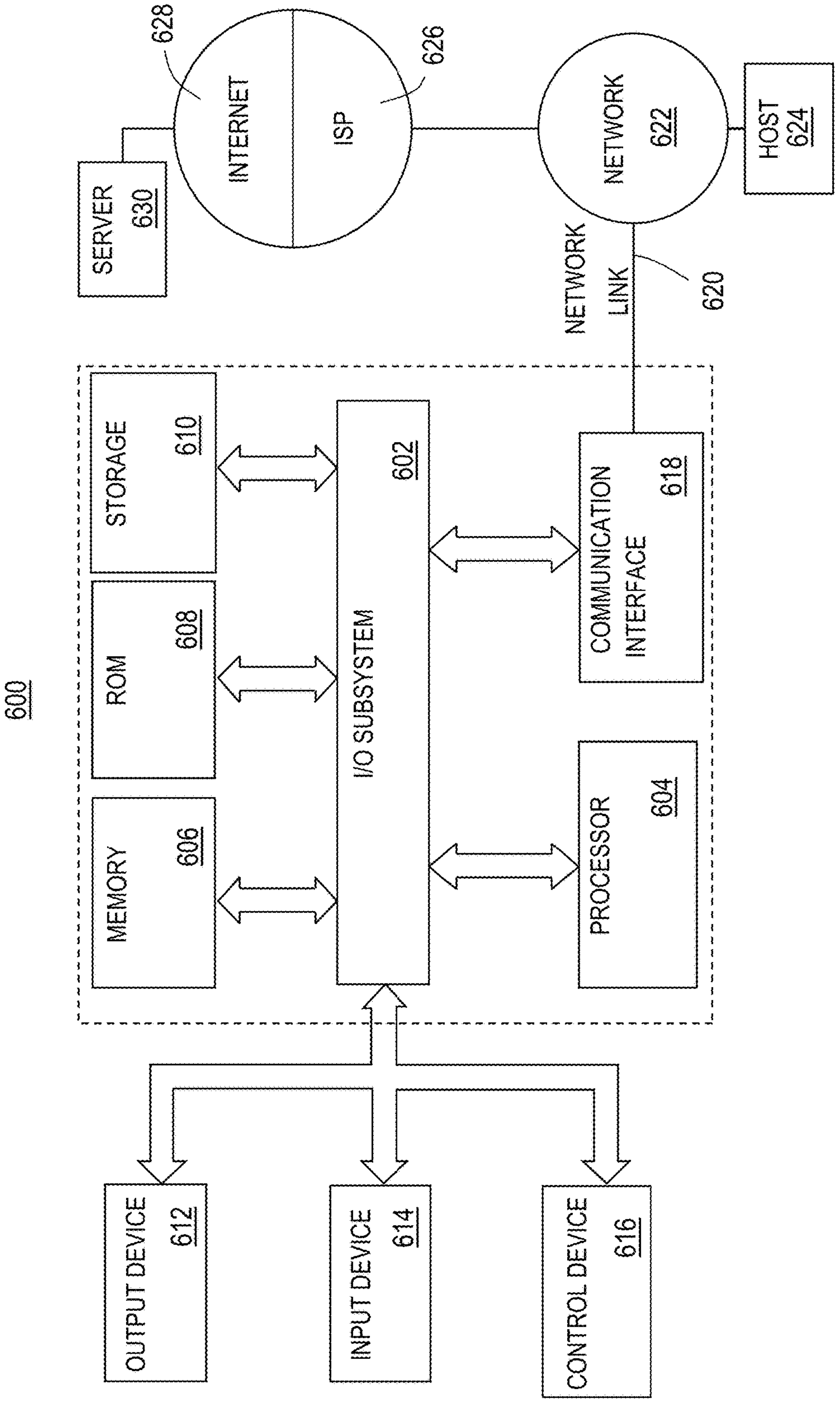
FIG. 6 is a block diagram that illustrates an example computer system with which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. I/O subsystem 602 may include an I/O controller, a memory controller, and at least one I/O port. The electronic signal paths are represented schematically in the drawings, such as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system, a graphics processing unit (GPU), or a digital signal processor or ARM processor. Processor 604 may comprise an integrated arithmetic logic unit (ALU) or be coupled to a separate ALU.

Computer system 600 includes one or more units of main memory 606, such as a main memory, coupled to I/O subsystem 602 for electronically digitally storing data and instructions to be executed by processor 604. Main memory 606 may include volatile memory such as various forms of random-access memory (RAM) or other dynamic storage device. Main memory 606 may also be used for storing temporary variables or other intermediate information during the execution of instructions to be executed by processor 604. Such instructions, when stored in non-transitory computer-readable storage media accessible to processor 604, can render computer system 600 into a special-purpose machine customized to perform the operations specified in the instructions.

Computer system 600 includes non-volatile memory such as read only memory (ROM) 608 or another static storage device coupled to I/O subsystem 602 for storing information and instructions for processor 604. ROM 608 may include various forms of programmable ROM (PROM), such as erasable PROM (EPROM) or electrically erasable PROM (EEPROM). A unit of storage 610 that is persistent may include various forms of non-volatile RAM (NVRAM), such as FLASH memory, solid-state storage, magnetic disk, or optical disk such as CD-ROM or DVD-ROM and may be coupled to I/O subsystem 602 for storing information and instructions. Storage 610 is an example of a non-transitory computer-readable medium that may be used to store instructions and data, which, when executed by the processor 604, causes performing computer-implemented methods to execute the techniques herein.

The instructions in main memory 606, ROM 608, or storage 610 may comprise one or more instructions organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using structured query language (SQL) or no SQL, an object store, a graph database, a flat file system, or other data storage.

Computer system 600 may be coupled via I/O subsystem 602 to at least one output device 612. In one embodiment, output device 612 is a digital computer display. Examples of a display that may be used in an embodiment include a touchscreen display, a light-emitting diode (LED) display, a liquid crystal display (LCD), or an e-paper display. Computer system 600 may include other types of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. The control device 616 may be a touchpad, a mouse, a trackball, or cursor direction keys for communicating direction information and command selections to processor 604 and for controlling cursor movement on the output device 612. Control device 616 may have at least two degrees of freedom in two axes, a first axis (for example, x) and a second axis (for example, y), that allows the device to specify positions in a plane. Another type of input device may be a wired, wireless, or optical control device such as a joystick, wand, console, steering wheel, pedal, gearshift mechanism, or other control device. Input device 614 may include a combination of multiple different input devices, such as a video camera and a depth sensor.

In another embodiment, computer system 600 may comprise an Internet of Things (IT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders, and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire, fiber optics, and wires comprising a bus of I/O subsystem 602. Transmission media can also be acoustic or light waves generated during radio-wave and infrared data communications.

Various forms of media may carry at least one sequence of at least one instruction to processor 604 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal, and driver circuitry can provide the data to I/O subsystem 602, such as placing the data on a bus. I/O subsystem 602 carries the data to main memory 606, from which processor 604 retrieves and executes the instructions. The instructions received by main memory 606 may optionally be stored on storage 610 before or after execution by processor 604.

Computer system 600 also includes a communication interface 618 coupled to I/O subsystem 602. Communication interface 618 provides a two-way data communication coupling to network link(s) 620 directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to host 624.

Furthermore, network link 620 may connect through network 622 or to other computing devices via internetworking devices and/or computers operated by an Internet Service Provider (ISP) 626. ISP 626 provides data communication services through a worldwide packet data communication network, Internet 628. A server 630 may be coupled to Internet 628. Server 630 broadly represents any computer, data center, virtual machine, or virtual computing instance with or without a hypervisor or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, a server farm, or other organizations of computers that cooperate to perform tasks or execute applications or services. Server 630 may comprise one or more instructions organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer, and data storage layer, such as a relational database system using structured query language (SQL) or no SQL, an object store, a graph database, a flat file system, or other data storage.

Computer system 600 can send messages and receive data and instructions, including program code, through the network(s), network link 620, and communication interface 618. In the Internet example, server 630 might transmit a requested code for an application program through Internet 628, ISP 626, network 622, and communication interface 618. The received code may be executed by processor 604 as it is received and/or stored in storage 610 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be executing those instructions. Several processes may be associated with the same program; for example, opening several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the present disclosure have been described with reference to numerous specific details that may vary from implementation to implementation. Accordingly, the specification and drawings are to be regarded in an illustrative rather than a restrictive sense. The sole and exclusive indicator of the scope of the present disclosure, and what is intended by the applicants to be the scope of the present disclosure, is the literal and equivalent scope of the set of claims issued from this application in the specific form in which such claims issue, including any subsequent correction.

What is claimed is:

1. A computer-implemented method comprising:

parsing a communication record and outputting a plurality of tokens, fields, items, or parts of the communication record;

executing an inference stage of a trained machine learning model over the plurality of tokens, fields, items, or parts of the communication record to output one or more intents of the communication record;

linking the communication record to one or more record IDs of transaction records in an online e-procurement system;

identifying one or more fields within the communication record, the one or more fields including, for at least one text line in the communication record and associated with one of the one or more intents, an extracted purchase-order line number and one or more extracted values comprising at least one of a price, a quantity, or a delivery date;

generating one or more structured data objects based on the one or more fields that were identified and the one or more intents, wherein the one or more structured data objects are configured for updating a transaction record to which the communication record is linked;

matching the extracted purchase-order line number to a purchase-order line number of the transaction record to which the communication record is linked;

presenting the communication record in a standardized form in a preview pane of a graphical user interface on a computer display device, including identification of intent, the standardized form resulting from the one or more fields that were identified;

when the extracted purchase-order line number matches the purchase-order line number of the transaction record, using the one or more structured data objects, generating one or more non-committed updates to the transaction record to which the communication record is linked, wherein the one or more non-committed updates apply the one or more extracted values to a draft confirmation corresponding to the matched purchase-order line number;

determining a corresponding intent-related action for the transaction record to which the communication record is linked based on the one or more intents that were determined based on receiving input, through the preview pane, specifying a verification of the one or more non-committed updates;

in response to receiving the input specifying verification, automatically updating one or more fields of the transaction record by executing the corresponding intent-related action.

2. The computer-implemented method of claim 1, wherein the communication record comprises an order for a product or service and wherein determining the one or more intents comprises ascertaining whether the one or more intents are to confirm an order.

3. The computer-implemented method of claim 1, wherein the communication record includes a plurality of intents, each intent identified within the communication record at a different text line number, and wherein each intent is stored in a relational database, such that each intent is associated with the different text line number.

4. The computer-implemented method of claim 1 further comprising linking the communication record to at least one record identification corresponding to a purchase order number.

5. The computer-implemented method of claim 4 further comprising automatically creating or updating an order confirmation object, wherein the order confirmation object comprises data associated with the purchase order number.

6. The computer-implemented method of claim 5, wherein the data includes at least one of: a type of product or services delivered, delivery dates for products or services, a number of items delivered, price for items delivered, item descriptions, or order status.

7. The computer-implemented method of claim 1, wherein identifying the one or more fields within the communication record include identifying at least one of: a purchase order number, a price of a product, a confirmation status, a unit of measure of the product, a quantity of the product, a need by date, a promised date, or an item description.

8. The computer-implemented method of claim 1, wherein presenting the communication record in a standardized form includes presenting order confirmation objects within the graphical user interface, wherein the graphical user interface comprises a table, with table rows corresponding to the order confirmation objects and table columns corresponding to the one or more fields associated with the order confirmation objects.

9. The computer-implemented method of claim 1, the corresponding intent-related action comprises one of confirming acceptance of changes, confirming a rejection of changes, or confirming acceptance of changes with conditional requirements.

10. The computer-implemented method of claim 9, wherein the conditional requirements include changes to a price of a product, changes to number of items delivered, changes to a delivery date, or combination thereof.

11. The computer-implemented method of claim 1, further comprising training the trained machine learning model using a training data set comprising a plurality of electronic documents and a labeled intent for each line of each electronic document in the training data set.

12. The computer-implemented method of claim 1 further comprising:

causing displaying the graphical user interface that is programmed with one or more action widgets;

receiving input from a user computer to the one or more action widgets to specify an action for the communication record, the action being one of an acceptance of changes, a rejection of changes, or an acceptance of changes conditionally.

13. One or more non-transitory computer-readable storage media storing one or more sequences of instructions which, when executed using one or more processors, cause the one or more processors to execute:

parsing a communication record and outputting a plurality of tokens, fields, items, or parts of the communication record;

executing an inference stage of a trained machine learning model over the plurality of tokens, fields, items, or parts of the communication record to output one or more intents of the communication record;

linking the communication record to one or more record IDs of transaction records in an online e-procurement system;

identifying one or more fields within the communication record, the one or more fields including, for at least one text line of the communication record associated with one of the one or more intents, an extracted purchase-order line number and one or more extracted values comprising at least one of a price, a quantity, or a delivery date;

generating one or more structured data objects based on the one or more fields that were identified and the one or more intents, wherein the one or more structured data objects are configured for updating a transaction record to which the communication record is linked;

matching the extracted purchase-order line number to a purchase-order line number of the transaction record to which the communication record is linked;

presenting the communication record in a standardized form in a preview pane of a graphical user interface on a computer display device, including identification of intent, the standardized form resulting from the one or more fields that were identified;

when the extracted purchase-order line number matches the purchase-order line number of the transaction record, using the one or more structured data objects, generating one or more non-committed updates to the transaction record to which the communication record is linked, wherein the one or more non-committed updates apply the one or more extracted values to a draft confirmation corresponding to the matched purchase-order line number;

determining a corresponding intent-related action for the transaction record to which the communication record is linked based on the one or more intents that were determined based on receiving input, through the preview pane, specifying a verification of the one or more non-committed updates;

in response to receiving the input specifying verification, automatically updating one or more fields of the transaction record by executing the corresponding intent-related action.

14. The non-transitory computer-readable storage media of claim 13, wherein the communication record comprises an order for a product or service and wherein determining the one or more intents comprises ascertaining whether the one or more intents are to confirm an order.

15. The non-transitory computer-readable storage media of claim 13, wherein the communication record includes a plurality of intents, each intent identified within the communication record at a different text line number, and wherein each intent is stored in a relational database, such that each intent is associated with the different text line number.

16. The non-transitory computer-readable storage media of claim 13, further comprising sequences of instructions which, when executed using the one or more processors, cause the one or more processors to execute linking the communication record to at least one record identification corresponding to a purchase order number.

17. The non-transitory computer-readable storage media of claim 16 further comprising sequences of instructions which, when executed using the one or more processors, cause the one or more processors to execute automatically creating or updating an order confirmation object, wherein the order confirmation object comprises data associated with the purchase order number.

18. The non-transitory computer-readable storage media of claim 17, wherein the data includes a type of product or services delivered, delivery dates for products or services, a number of items delivered, price for items delivered, item descriptions, or order status.

19. The non-transitory computer-readable storage media of claim 13, wherein the sequences of instructions for identifying the one or more fields within the communication record include sequences of instructions which, when executed using the one or more processors, cause the one or more processors to execute identifying at least one of: a purchase order number, a price of a product, a confirmation status, a unit of measure of the product, a quantity of the product, a need by date, a promised date, or an item description.

20. The non-transitory computer-readable storage media of claim 13, wherein the sequences of instructions for presenting the communication record in a standardized form include sequences of instructions which, when executed using the one or more processors, cause the one or more processors to execute presenting order confirmation objects within the graphical user interface, wherein the graphical user interface comprises a table, with table rows corresponding to the order confirmation objects and table columns corresponding to the one or more fields associated with the order confirmation objects.

21. The non-transitory computer-readable storage media of claim 13, the corresponding intent-related action comprises one of confirming acceptance of changes, confirming a rejection of changes, or confirming acceptance of changes with conditional requirements.

22. The non-transitory computer-readable storage media of claim 21, wherein the conditional requirements include changes to a price of a product, changes to number of items delivered, changes to a delivery date, or combination thereof.

23. The non-transitory computer-readable storage media of claim 13, further comprising sequences of instructions which, when executed using the one or more processors, cause the one or more processors to execute training the trained machine learning model using a training data set comprising a plurality of electronic documents and a labeled intent for each line of each electronic document in the training data set.

24. The non-transitory computer-readable storage media of claim 13, further comprising sequences of instructions which, when executed using the one or more processors, cause the one or more processors to execute:

causing displaying the graphical user interface that is programmed with one or more action widgets;

receiving input from a user computer to the one or more action widgets to specify an action for the communication record, the action being one of an acceptance of changes, a rejection of changes, or an acceptance of changes conditionally.

* * * * *